Figure 5:
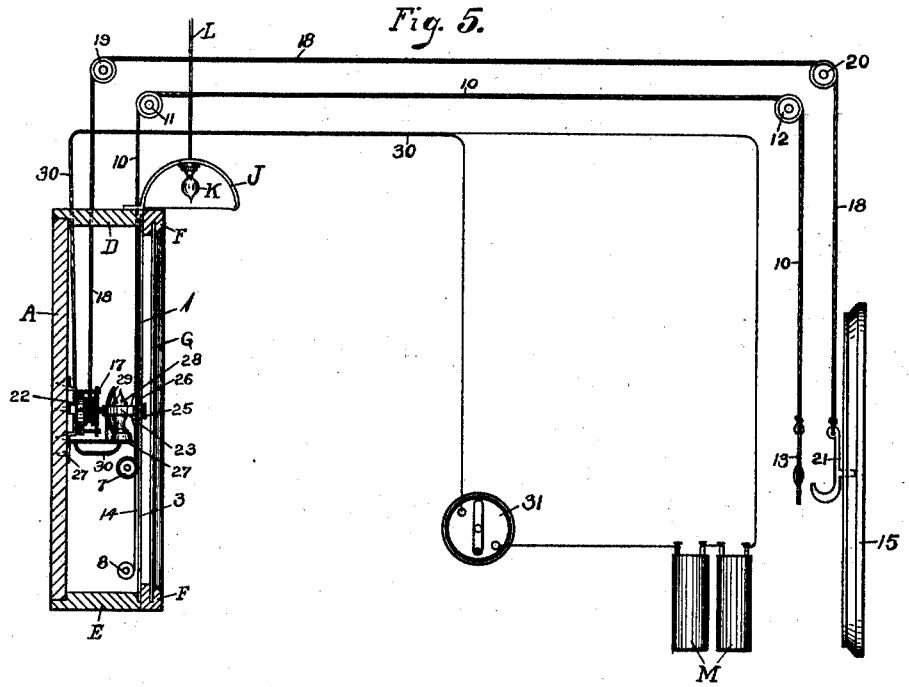

No. 760,458. PATENTED MAY 24, 1904.
L. C. LAWALL.
OPHTHALMIC CABINET.
APPLICATION FILED MAY 27, 1903.
NO MODEL. 2 SHEETS—SHEET 1.
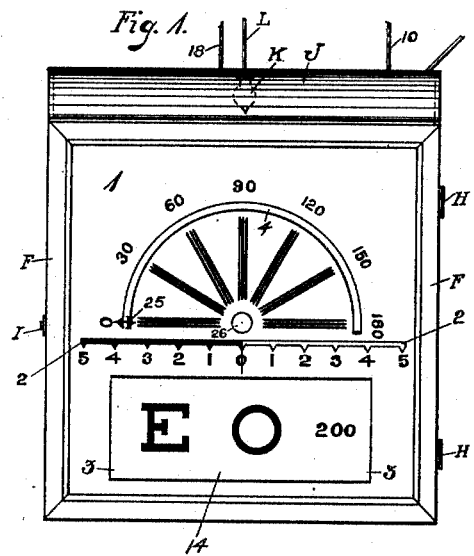
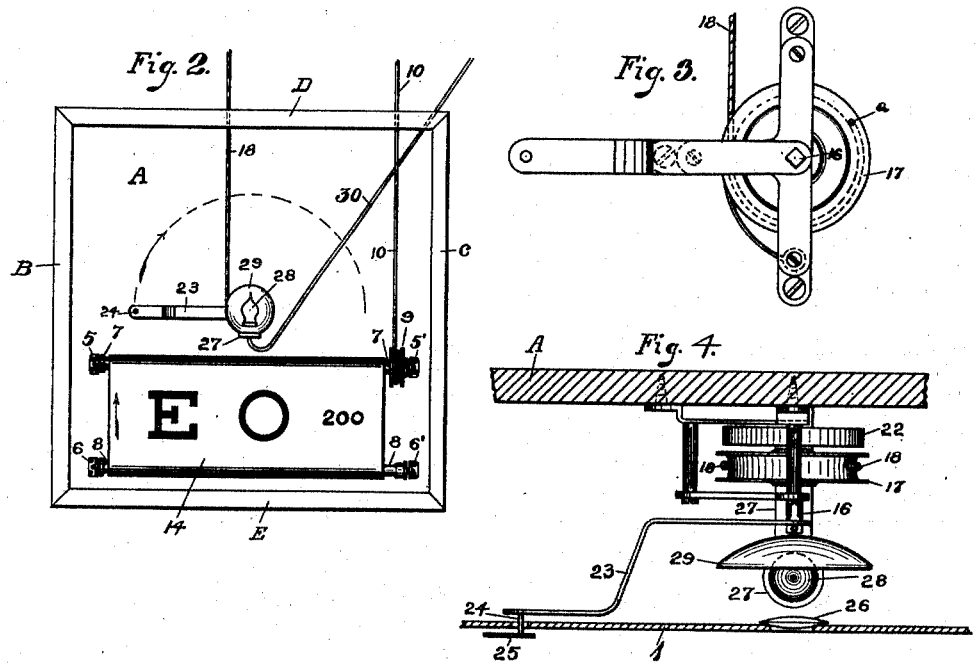
WITNESSES:
Edwin C. Dozier
Herbert R. Marlatt.
LEWIS C. LAWALL.
INVENTOR.
BY Robert W. Randle
ATTORNEY.

No. 760,458. PATENTED MAY 24, 1904.
L. C. LAWALL.
OPHTHALMIC CABINET.
APPLICATION FILED MAY 27, 1903.
NO MODEL. 2 SHEETS—SHEET 2.

WITNESSES:
Edwin C. Dozier.
Herbert R. Marlatt.

LEWIS C. LAWALL.
INVENTOR.
BY Robert W. Randle
ATTORNEY.

THE NORRIS PETERS CO., PHOTO-LITHO., WASHINGTON, D. C.

No. 760,458.	Patented May 24, 1904.

UNITED STATES PATENT OFFICE.

LEWIS C. LAWALL, OF RICHMOND, INDIANA, ASSIGNOR OF ONE-HALF TO FRANK D. SHERA, OF INDIANAPOLIS, INDIANA.

OPHTHALMIC CABINET.

SPECIFICATION forming part of Letters Patent No. 760,458, dated May 24, 1904.

Application filed May 27, 1903. Serial No. 159,018. (No model.)

*To all whom it may concern:*

Be it known that I, LEWIS C. LAWALL, a citizen of the United States, and a resident of Richmond, in the county of Wayne and State of Indiana, have made certain new and useful Improvements in Ophthalmic Cabinets, of which the following is a specification, which when taken in connection with the accompanying drawings, forming a part thereof, is sufficiently clear and concise as to enable others skilled in the art to which it appertains to make and use the same.

The object of my invention, broadly speaking, is to provide an improved cabinet and means for operating same for use in opthalmic tests, substantially as hereinafter set forth.

A more specific object is to provide a mechanism for determining astigmatic and muscular insufficiency in the human eyes, providing efficient means for testing eyes to determine the presence of abnormal refraction, and for accurately determining the length of vision from a certain comparative scale of objects, assisted by direct and reflected rays of electric light.

Another object is to provide an opthalmic cabinet which will be strong and durable in construction, positive in action, which will be neat and attractive in appearance, which can be manufactured and sold at a comparatively low price, and which may be easily operated and controlled to produce the requisite results.

Other objects and specific advantages of my invention will appear from this specification, from the drawings forming a part thereof, and from the claims hereunto appended.

My present invention comprises, broadly, a cabinet permanently secured at a point on a line with the eyes to be examined and tested, an electric-light system for illuminating a point in the cover of the cabinet and one for illuminating the entire face of the cover, the instrumentalities for controlling various operations of the cabinet and the electric lights, the cover of the cabinet having an astigmatic chart with an indicator therefor, the said cover having a series of figures arranged for muscle-tests, said cover having a test-chart showing therethrough, mounted on rollers operative to bring into view a progression of characters, with figures denoting the distance said characters should be read by the normal eye, and the novel interior mechanisms by which said parts are operated and controlled.

One manner of carrying out my invention and that which in practice has been found to be the most desirable is illustrated in the accompanying drawings, in which—

Figure 6:
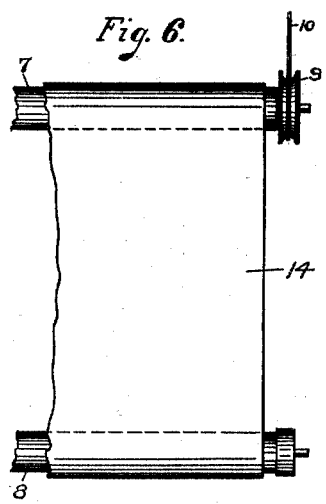
Figure 7:
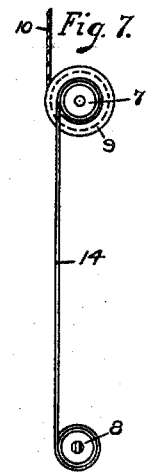
Figure 8:
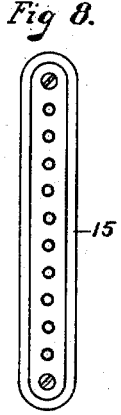

Figure 1 is a front elevation of my cabinet. Fig. 2 is a front elevation of same with the cover removed. Fig. 3 is a detail front elevation of a portion of the interior mechanism. Fig. 4 is a detail top plan of the interior mechanism, partly in section. Fig. 5 is a vertical section through the cabinet and means for operating the mechanisms at a distance therefrom. Fig. 6 is a detail of a portion of the test-charts, showing the manner in which same is operated. Fig. 7 is an end view of the parts shown in Fig. 6, and Fig. 8 is a detail of the adjusting-plate.

Similar reference characters refer to and denote like parts throughout the several views.

With all the above-designated views in mind I will now take up the description of my invention in detail, which I will refer to as briefly and compactly as I may.

The body of my cabinet consists of a back A, preferably of an almost square shape, with the side members B and C and the top and bottom members D and E, respectively, extending out therefrom to substantially the proportionate distance indicated in Fig. 5, and all of said outwardly-extending members are permanently secured to the edges of the back A in any well-known manner. Of substantially the same outer dimensions as the back A is a frame or sash F, in which is secured a transparent glass G, (shown in Fig. 5,) said frame being hinged to the side member C by the hinges H, and the opposite edge of the frame may be provided with a catch or hook I to secure the frame closed. Secured to the forward edge of the top D, extending from side to side of the cabinet and extending forward from the cabinet in approximately a half-circle, is the reflector J, its ends being closed and presenting a concave surface facing downward in front of the glass G, as shown in Fig. 5. In the center of the concavity of the reflector J is an electric-light lamp K, which may be maintained and controlled in any well-known preferred manner with a wire L, leading therefrom to the source of supply.

Secured to the front edges of the body of the cabinet back of the glass G is the cover 1, and permanently printed thereon and extending thereacross horizontally slightly below the center thereof is a muscle-test scale 2, with index-numerals therebelow commencing in the center with "0" and indicated in progressive succession outward on each side thereof to "5," as shown in Fig. 1. The manner of using said muscle-test scale is as follows: A person in front of the scale may first focus his eyes on "0" and then endeavor to see the corresponding figures "1" and "1," "2" and "2," "3" and "3," "4" and "4," or "5" and "5" at one time, the ability to see the highest pair of figures being the object of the test.

Below the scale just referred to is a rectangular aperture 3 through the dial 1 for the purpose of exhibiting the test-chart 14 and for exposing to view only one portion of said chart at a time, the operation of which will be further referred to hereinafter.

Above the scale 2 the balance of the cover 1 is occupied by the astigmatic chart, which consists of the segmental slot 4, formed through the cover 1, its terminals being slightly above the scale 2. Radiating from near the axis of said slot to near said slot is a series of triplicate sets of lines printed on the cover and equidistant apart, with figures progressing from left to right also printed on the cover at points above said slot and opposite each set of said lines, as shown in Fig. 1.

Secured to the back A and extending forward to near the front of the cabinet are four hangers 5 5' and 6 6', the former carrying revolubly the upper roller 7 and the latter the lower roller 8. The roller 8 is a spring-roller of any well-known construction, to which I make no claim except as to its adaptation to this purpose. Secured to the upper roller near the right-hand point thereof is a spool 9, with a cord 10 secured in the groove of said spool, and then extending upward through an aperture in the top D, thence over the pulley 11, thence forward some distance, passing over the pulley 12, and thence downward, where it is secured in the eye of the operating and securing dog 13, which latter is in easy access of the operator.

The numeral 14 represents the test-chart, which consists of a comparatively long strip of fibrous material, such as paper or cloth, of a width slightly less than the length of the rollers 7 and 8 and of any preferred length. One end of the chart 14 is secured to the roller 7, and the other end thereof is secured to the roller 8, and the chart is then rolled partially onto one or both of said rollers, and the rollers are then mounted in their respective hangers, presenting the appearance shown in Fig. 2.

The spring-roller 8 tends at all times to retain the chart 14 normally wound thereon, in which position the cord 10 is wound on the spool 9 to a length substantially the same as the length of the chart. By the construction just stated it will be seen that the operator may pull down on the dog 13, which will unwind the cord 10 from the spool 9, thereby revolving the roller 7 and causing the chart 14 to unwind from the roller 8 and wind onto the roller 7, and thus exposing any portion desired of the surface of the chart 14. The chart 14 has printed or otherwise attached thereon at frequent distances apart one or more series of lines or groups of letters or characters—as, for instance, "E O"—each line or group containing letters or characters of a different size from the other lines or groups, and to one side of each line or group of letters or characters is printed a numeral— as, for instance, "200"—which numeral suggests the distance at which the test for that particular size of letter should be read by the normal eye.

Secured near the center of the back A, inside the cabinet, is a frame having a rear and a forward plate connected some distance apart by posts, as shown in Figs. 3 and 4, with a shaft 16, revolubly pivoted between said plates and projecting forward therefrom. A spool 17 is secured to said shaft between said plates. Through either one or both of the flanges of said spool is a small opening a, in one of which is secured one end of the cord 18, so adjusted that a portion of it is adapted to be wound on said spool. The cord 18 passes upward through an opening in the top D, thence over the pulley 19, thence forward over the pulley 20, and thence downward, where it is secured in the eye of the dog 21. The dogs 13 and 21 are exact duplicates of each other, the dog 13 showing an edge view and the dog 21 a side view of the same construction. Also mounted on the shaft 16, with its inner end secured thereto, is a flat coil-spring 22, with its outer end secured to one of the posts of the frame above referred to.

Secured to the forward squared end of the shaft 16 forward of the front plate of the frame is an arm 23, which extends outward and forward, with its extreme outward portion parallel with the and a slight distance from the back of the cover 1, and extending a slight distance beyond the slot 4 and at a point midway of said slot is a stud 24, secured to said arm, which extends through said slot, and on the outer end of said stud is secured an indicator 25. The shaft 16 being on a line with the ascertained axis of the slot 4, it will be apparent that the stud 24 will at all times travel in the center of said slot when the shaft 16 is rotated. The resiliency of the spring 22 is such as to normally retain the arm 23 to the left and the indicator 25 pointing to "0," as in the drawings; but should the operator so desire he may pull down on the dog 21, which will cause the shaft 16 to turn, carrying the arm 23 to the right until the indicator points to any degree desired within the limit of the slot 4, said degrees being indicated by the numerals ascending from "0" to "180," as indicated in Fig. 1.

Secured within easy reach of the operator while examining a patient's eyes is a vertical plate 15, having holes therethrough adapted to receive the horizontal points of the dogs 13 and 21, by which either or both of said dogs may be detachably secured in order to lock the chart 14 or the indicator 25 at the desired point.

The lower portions of the dogs 13 and 21 each terminate in a hook to provide means for the operator to move them to the point desired within the limit of the length of the plate 15.

Through the cover 1 at a point which is the exact imaginary axis of the slot 4 is a round aperture, in which is fitted a lens 26, the purpose of which is to magnify the intensity of the light of the lamp 28 when viewed from the front of the cabinet. Secured to the back A immediately below the frame of the shaft 16 is a bracket 27, which extends forward beyond the forward end of the shaft 16, and mounted on the forward end of said bracket is a small electric-light lamp 28, with its most intense point of light immediately back of the lens 26.

Immediately in the rear of the lamp 28 is a reflector 29, also secured to the bracket 27 and supported thereby.

The utility of the lens 26 is to illumine a single point in the cover for testing the ability of the eyes of a person to withstand the glare of the light magnified by the lens and the reflector, but more especially to afford a central attractive point to attract and hold the attention of the person whose eyes are being tested and also to illuminate the cover.

Extending down from the lamp 28 through the bracket 27 is a double supply-wire 30, the outer ends of which are connected to the negative and positive poles of the battery M, thus forming an electric circuit for maintaining the lamp 28. In order to control said light and open and close said circuit, I provide a cut-out or switch provided with a lever for breaking and completing the circuit at the will of the operator. Said cut-out is represented by the numeral 31, and I prefer to locate it near the plate 15 or at any convenient point which will be accessible to the operator.

In practice I prefer that the face of the cover 1 should be solid black, except the segmental space inclosed by the slot 3, which should be white, with the radiating lines thereon in black. The figures above the slot 4 should be in white, and the muscle-test scale 2 and its index-figures should be in white, or one-half of said muscle-test scale and the figures therebelow may be in red or some other suitable color, as preferred.

While I have illustrated and described the best means now known to me for carrying out my invention, I wish it to be understood that I do not restrict myself to the exact details of construction shown and described, but hold that any changes or variations in such details as would suggest themselves to the ordinary mechanic would clearly fall within the limit and scope of my invention.

The terms "front," "rear," "forward," "right," "left," and other similar terms are used only for convenience of description, and it is not intended by the use of such terms to limit the arrangement and operation of the several parts to the relative positions indicated.

Having now fully shown and described my invention, what I claim as new, and desire to secure by Letters Patent of the United States, is—

1. In an ophthalmic cabinet the combination of the cover for the front of the cabinet having a segmental astigmatic chart and also having a muscle-test, a movable indicator for said chart, a movable test-chart inside the cabinet, the cover having an opening therethrough at the axis of the astigmatic chart, an electric light within the cabinet opposite said opening, means for operating said indicator—the test-chart—and the electric light—at a distance from the cabinet, and an electric light and a reflector for illuminating the face of the cover, all substantially as shown and described.

2. An ophthalmic cabinet having in combination, a cover for the cabinet having an astigmatic chart and also having a muscle-test chart, a test-chart inside the cabinet and an electric-light point appearing from the face of said cover, and means for controlling the movable parts of the cabinet from a distance, all substantially as shown and described, for the purposes set forth.

3. An ophthalmic cabinet having in combination, a cover for the cabinet having an astigmatic chart and also having a muscle-test chart, a test-chart inside the cabinet, the cover having an aperture therethrough at the axis of the astigmatic chart, a lens covering said aperture, an electric-light lamp within the cabinet opposite said aperture, a reflector in the rear of said lamp, and means for controlling said light at a distance from the cabinet, all substantially as shown and described.

4. In an ophthalmic cabinet, in combination, a case having a cover, means for obtaining astigmatic tests, muscle-tests, and tests of the length of vision, from the face of said cover, means for controlling the movable parts at a distance from the cabinet, an interior light for illuminating a single point in said cover, and an exterior light for illuminating the face of said cover, all substantially as shown and described.

In testimony whereof I have hereunto signed my name in the presence of two subscribing witnesses.

LEWIS C. LAWALL.

Witnesses:
ROBERT W. RANDLE,
R. E. RANDLE.